April 9, 1929.  F. L. HUDSON  1,708,762
DECOY
Filed March 18, 1927
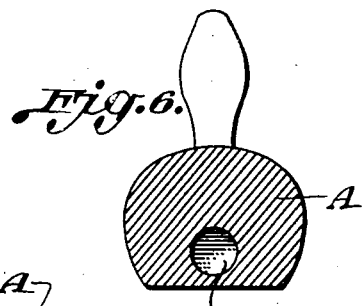
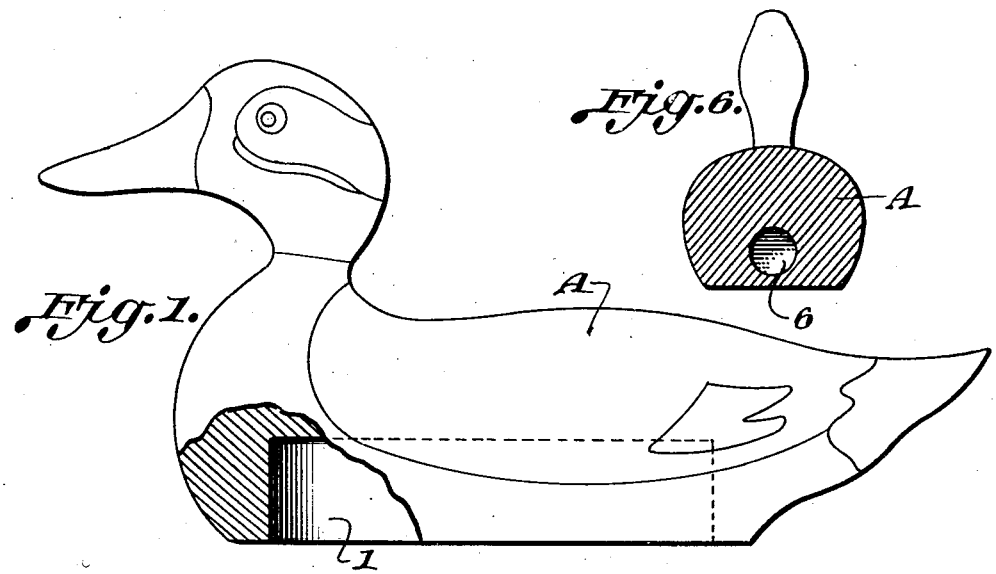
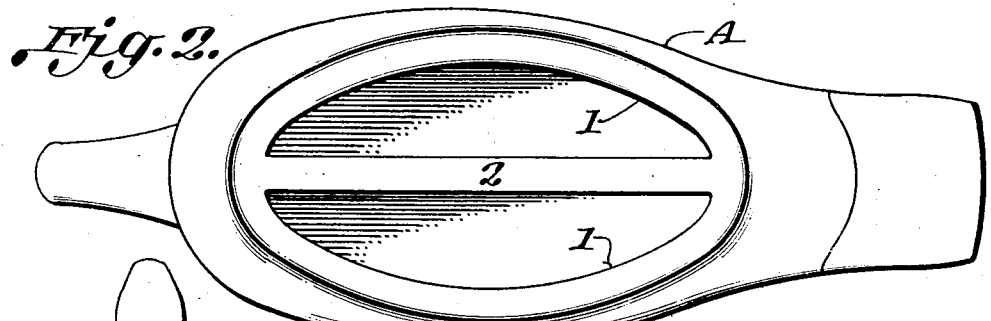
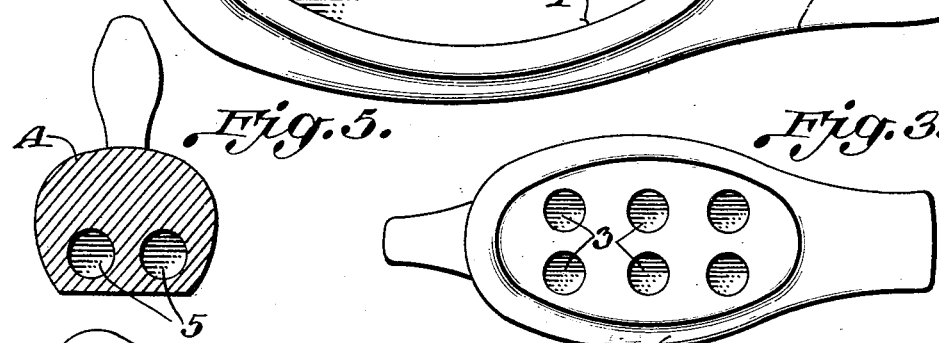
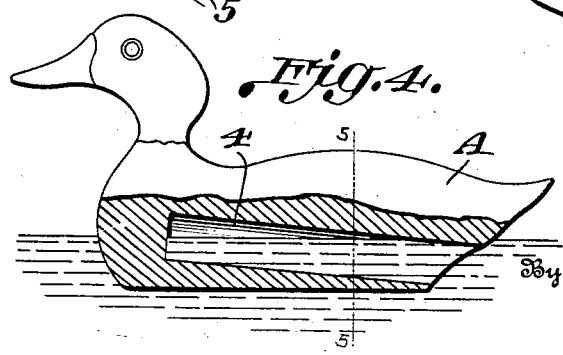
Inventor
Frank L. Hudson
By Baldwin Wight
Attorneys Patented Apr. 9, 1929.

1,708,762

UNITED STATES PATENT OFFICE.

FRANK L. HUDSON, OF PASCAGOULA, MISSISSIPPI.

DECOY.

Application filed March 18, 1927. Serial No. 176,366.

This invention relates to decoys and is illustrated as representing the usual decoy duck although the principle of the invention may be applied to representations of other fowls. It has previously been difficult to produce a satisfactory decoy for various reasons. If the material is light enough in order that the decoy may float properly, it is apt to be unstable and it has frequently been found necessary to anchor the decoy in some way, which, of course, is objectionable. Decoys have also been produced of materials which are heavier than water and these have been sustained in proper position by a support. It is also old to inflate a flexible body portion in order to form a light decoy which will float, but there are obvious defects in such constructions.

The present invention provides a decoy which can be made of a single piece of material of any desired character such as wood, fibre, papier mâché, or the like. The weight of the decoy is lessened and its stability increased by forming in the bottom or sides of the same slots or holes of varying shape which may be of any desired size or contour but are preferably arranged symmetrically with regard to the longitudinal center line of the decoy. Moreover, when the decoy is placed upon the water, the outer ends of the openings or cavities are closed by contact with the water and a certain amount of air will be trapped within said cavities. This acts to cushion and stabilize the decoy and give the same an extremely natural appearance when floating on the water.

In the drawings:

Figure 1 is a side elevation of a decoy having parts broken away to show one form of cavity.

Figure 2 is a bottom plan view of Figure 1.

Figure 3 is a similar bottom plan view of a modification.

Figure 4 is a side elevation with parts broken away showing a still further modification.

Figure 5 is a transverse section on the line 5—5 of Figure 4.

Figure 6 is a transverse section showing a modified form.

The body A of the decoy may be formed of any desired material and may be designed to represent any water fowl or animal as desired. In the form shown in Figures 1 and 2, two semi-elliptical cavities 1 are formed in the bottom of the decoy and are separated by a longitudinal rib or partition 2. It is obvious that the removal of the material for the purpose of forming these cavities will reduce the weight of the decoy, but the main purpose of these cavities is to trap a certain amount of air when the decoy is placed upon the surface of the water. This air will be compressed and remain in the upper part of the cavities and since the cavities are symmetrical on both sides of the longitudinal axis of the decoy, the latter will be stabilized and will float gracefully and steadily upon the water. The heavier the decoy is, the larger the cavities should be to properly support and stabilize the decoy.

In the modification shown in Figure 3, a plurality of circular holes 3 are formed in the bottom of the decoy. These are arranged symmetrically and function exactly as the larger cavities 1 in the first form.

Instead of forming the openings in the bottom of the decoy they may be bored into the same from the ends as shown in Figures 4, 5, and 6. In the form shown in Figures 4 and 5, there are two bores 4 symmetrically placed with regard to the body of the decoy and extending from the rear of the same to a point relatively near the front. These bores are slightly inclined upward toward the front end so that when the decoy is placed upon the water, it will sink in the same until the rear opening of the bore is entirely closed as shown in Figure 4. This will trap a certain amount of air in the front portion as indicated in this figure and will, therefore, give the same buoyancy and stabilizing effect to the decoy. As shown in Figure 6 a single bore may be substituted in place of the two indicated in Figure 5, although the stabilizing effect will not be as great in this construction.

It is, of course, possible to bore openings symmetrically from the sides of the decoy and incline the same slightly upward toward the center of the body. Since these openings would be necessarily shorter than those positioned vertically of the decoy, their effect would not be quite so great. The same fundamental principle would, however, be involved and the same broad result obtained. It is also apparent that the openings bored from the end or sides may be substantially horizontal, in which case the stabilizing effect would be obtained by the presence of the body of water within these bores as well as beneath the decoy. It is preferable, however, to have the openings so arranged that air will be trapped when the decoy is placed upon the surface of the water.

It may further be noted that if in any manner the cavities become filled or nearly filled with water which has displaced the air instead of compressing the same, then any effort to remove the decoy from the surface of the water or any violent displacement thereof will cause a partial vacuum in one or more of the cavities. For this reason the decoy will be stabilized even if the cavities have been partially filled with water which has displaced the air normally contained therein.

It is obvious that minor details in form and construction may be changed without in any way departing from the spirit of the invention, which is to be regarded as limited only by the scope of the appended claims.

I claim as my invention:

1. A decoy comprising a body portion having a plurality of non-communicating cavities formed in the lower part thereof and symmetrical with regard thereto said cavities being closed to the entrance of air when the decoy is in normal position.

2. A decoy comprising a body portion having a plurality of cavities formed in the lower part thereof and symmetrical with regard to the central vertical longitudinal plane of the decoy, said cavities being closed to the entrance of air when the decoy is in normal position, and the body of the decoy at said plane intermediate said cavities having a dividing partition.

3. A decoy comprising a body portion having a plurality of non-communicating cavities formed in the bottom thereof and symmetrical with regard to the body portion which cavities trap air when the decoy is placed on the water and thereby cushion and stabilize the decoy.

4. A decoy comprising a unitary body having a plurality of cavities formed in the lower part thereof and symmetrical with regard to the central vertical longitudinal plane of the decoy, the body being solid between said cavities, said cavities being so positioned that air will be trapped therein when the decoy is placed on the water, thereby cushioning and stabilizing the decoy.

5. A decoy comprising a body portion having an upwardly and inwardly extending cavity arranged to be closed at its lower end by the water in which the decoy is placed whereby air is trapped within the cavity.

6. A decoy comprising a body portion having a plurality of cavities in the bottom portion thereof arranged symmetrically with regard to the central vertical longitudinal plane of the body portion, each of said cavities being inclined so that their inner ends will be higher, whereby their outer ends will be closed by the water in which the decoy is placed and air will be trapped in said cavities inwardly of said ends.

In testimony whereof, I have hereunto subscribed my name.

FRANK L. HUDSON.